No. 831,602. PATENTED SEPT. 25, 1906.
J. COOKERLEY.
NUT LOCK.
APPLICATION FILED NOV. 22, 1905.
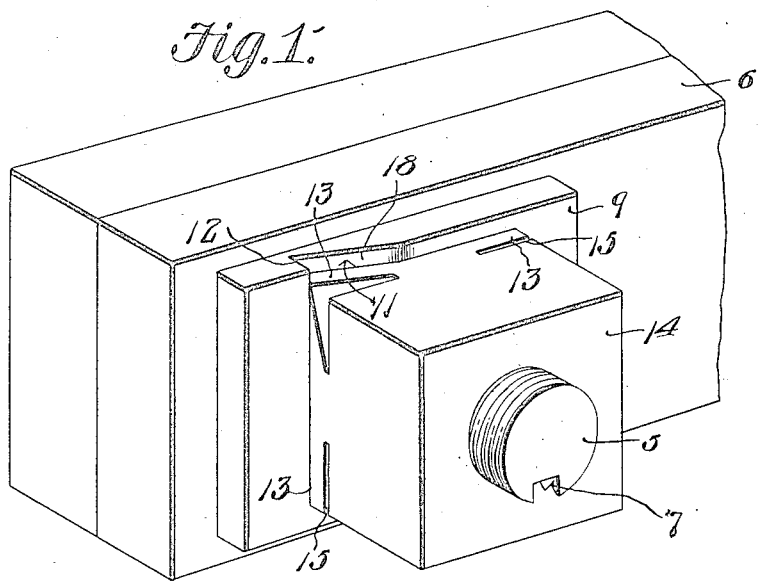
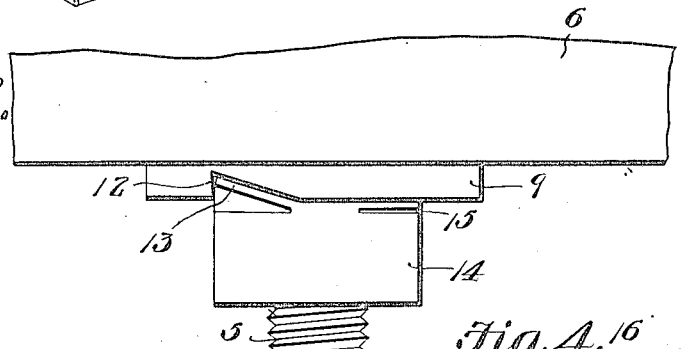
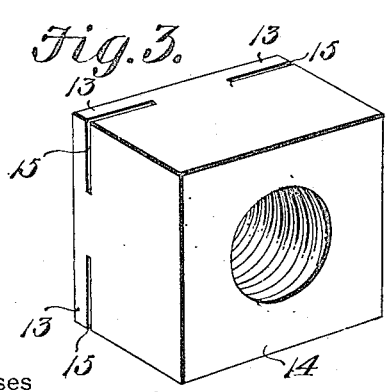
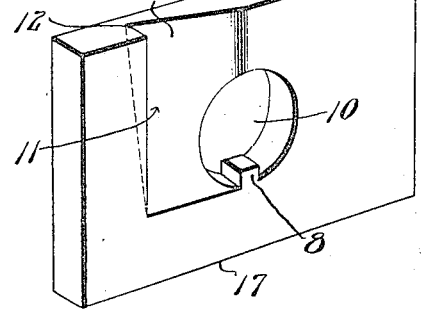
Josiah Cookerley, Inventor.

UNITED STATES PATENT OFFICE.

JOSIAH COOKERLEY, OF SOUTH MILFORD, INDIANA.

NUT-LOCK.

No. 831,602.　　Specification of Letters Patent.　　Patented Sept. 25, 1906.

Application filed November 22, 1905. Serial No. 288,553.

*To all whom it may concern:*

Be it known that I, JOSIAH COOKERLEY, a citizen of the United States, residing at South Milford, in the county of Lagrange and State of Indiana, have invented a new and useful Nut-Lock, of which the following is a specification.

This invention relates to nut-locks, and has for its object to provide a simple, durable, and inexpensive device of this character for locking nuts upon bolts, so as to prevent accidental displacement of the same.

A further object of the invention is to generally improve the class of devices so as to add to their utility and durability as well as to reduce the cost of manufacture.

With these and other objects in view the invention consists in the construction and novel combination and arrangement of parts, hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a perspective view of a nut-lock constructed in accordance with my invention. Fig. 2 is a top plan view of the same. Fig. 3 is a perspective view of the nut detached, and Fig. 4 is a similar view of the washer.

Similar numerals of reference indicate corresponding parts in all of the figures of the drawings.

In the preferred form of the invention the bolt 5 is shown passing through a suitable support 6 and provided with a longitudinally-disposed groove or channel 7 for the reception of the locking-lug 8 of a washer 9.

The washer 9 is preferably rectangular in shape, as shown, and provided with a central opening 10, adapted to receive the bolt 5, said washer being formed with a transverse recess 11, defining a locking-shoulder 12 for engagement with the locking-tongues 13 of the nut 14. The locking-tongues 13 are produced by forming slits or cuts 15 at the intersection of the angular faces of nuts, said cuts being preferably arranged parallel with and slightly spaced from the bottom of the nut, as shown, so as to permit said tongues to be readily bent downwardly into engagement with the shoulder 12 after the nut has been adjusted, as will be more fully explained hereinafter.

The transverse recess 11 extends from the longitudinal edge 16 of the washer and gradually decreases in depth from said edge to an imaginary line drawn tangentially to the walls of the bolt-receiving opening and parallel with the opposite longitudinal edge 17, said recess also decreasing in depth from the shoulder 12 to an imaginary line extending transversely of the washer and intersecting the axis of the opening 10, as shown. By having the recess formed in this manner any particular locking-tongue may be forced downwardly into engagement with the shoulder 12 after the nut has been adjusted, the remaining tongues presenting a flat smooth surface for engagement with the correspondingly flat surface of the washer, so that the nut may be rotated in the opposite direction to release said nut when desired.

In operation after the nut has been adjusted on the bolt a chisel or other suitable tool is inserted in the slot or cut and the tongue bent or forced downwardly into engagement with the shoulder 12, thereby locking the nut on the bolt and effectually preventing accidental displacement of the same.

In order to release the nut, it is simply necessary to give the nut a further rotation, which causes the tongue to engage the inclined face or bottom wall 18 of the recess, which restores the tongue to its normal position, thereby permitting the nut to be rotated in the reverse direction and readily removed from the bolt.

From the foregoing description it will be seen that there is provided an inexpensive and efficient nut-lock capable of being used on rail-joints, wagons, bridge structures, or wherever a device of this character is found desirable.

Having thus described the invention, what is claimed is—

1. The combination with a bolt, of a nut having slits formed at the intersection of its angular side walls defining locking tongues, and a washer having an opening for the reception of the bolt and provided with a transverse recess defining a shoulder, adapted to engage the locking-tongues, said recess gradually decreasing in depth from one longitudinal edge of the washer to a point adjacent the opposite edge thereof and also decreasing in depth from the shoulder to the bolt-receiving opening.

2. The combination with a bolt, of a nut having slits formed at the juncture of its angular side walls defining locking-tongues, and a washer provided with an opening for the reception of the bolt and having a transversely-disposed recess formed therein adapted to receive the locking-tongues, said recess gradually decreasing in depth from one longitudinal edge of the washer to an imaginary line drawn tangentially to the walls of the bolt-receiving opening and disposed approximately parallel with the opposite longitudinal edge of the washer.

3. The combination with a bolt, of a nut having slits formed at the juncture of its angular side walls defining locking-tongues and a washer provided with an opening for the reception of the bolt and having a transversely-disposed recess formed therein defining a shoulder adapted to engage the tongues, said recess gradually decreasing in depth from one longitudinal edge of the washer to an imaginary line drawn tangentially to the walls of the bolt-receiving opening, and also decreasing in depth from the shoulder to an imaginary line extending transversely of the washer and intersecting the axis of the bolt-receiving opening.

4. The combination with a bolt provided with a longitudinal groove, of a nut having slits formed at the juncture of its adjacent angular side walls, and a flat washer provided with a bolt-receiving opening the walls of which are formed with an inwardly-extending lug adapted to engage the longitudinal groove, there being a transverse recess formed in the washer defining a transverse shoulder adapted to engage the tongues when the latter are bent downwardly, said recess gradually decreasing in depth from one longitudinal edge of the washer to an imaginary line drawn tangentially to the walls of the bolt-receiving opening, and also decreasing in depth from the shoulder to approximately the center of said bolt-receiving opening.

In testimony that I claim the foregoing as my own I have hereto affixed my signature in the presence of two witnesses.

JOSIAH COOKERLEY.

Witnesses:
HARMER M. NEUNAM,
M. I. REED.